United States Patent
Biswas (10) Patent No.: US 9,058,282 B2
(45) Date of Patent: Jun. 16, 2015

(54) DYNAMIC CACHE WRITE POLICY

(71) Applicant: Intel Corporation, Santa Clara, CA (US)

(72) Inventor: Arijit Biswas, Holden, MA (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 13/732,301

(22) Filed: Dec. 31, 2012

(65) Prior Publication Data

US 2014/0189252 A1    Jul. 3, 2014

(51) Int. Cl.
G06F 12/00        (2006.01)
G06F 12/08        (2006.01)
G06F 13/00        (2006.01)
G06F 13/28        (2006.01)

(52) U.S. Cl.
CPC ........ G06F 12/0884 (2013.01); *G06F 12/0804* (2013.01); *G06F 12/0815* (2013.01)

(58) Field of Classification Search
CPC ................. G06F 12/08084; G06F 12/0815
USPC .......................................... 711/118, 142, 143
See application file for complete search history.

(56) References Cited

U.S. PATENT DOCUMENTS

| 5,325,504 | A |   | 6/1994  | Tipley et al. |
| 5,469,555 | A | * | 11/1995 | Ghosh et al. ................. 711/133 |
| 5,524,234 | A | * | 6/1996  | Martinez et al. ............. 711/141 |
| 5,530,832 | A |   | 6/1996  | So et al. |
| 5,664,154 | A |   | 9/1997  | Purcell et al. |
| 5,699,548 | A | * | 12/1997 | Choudhury et al. .......... 711/142 |
| 5,974,510 | A |   | 10/1999 | Cheng et al. |
| 6,430,657 | B1 |  | 8/2002  | Mittal et al. |
| 6,560,674 | B1 |  | 5/2003  | Hosogi et al. |
| 7,231,497 | B2 | * | 6/2007 | Trika et al. .................... 711/141 |
| 7,437,510 | B2 |  | 10/2008 | Rosenbluth |
| 7,886,110 | B2 |  | 2/2011  | Matthews |
| 8,296,534 | B1 |  | 10/2012 | Gupta et al. |
| 8,392,665 | B2 |  | 3/2013  | Moga et al. |
| 8,402,226 | B1 | * | 3/2013 | Faibish et al. ................. 711/143 |
| 2003/0101320 | A1 |  | 5/2003 | Chauvel et al. |
| 2003/0196040 | A1 |  | 10/2003 | Hosogi et al. |
| 2004/0153607 | A1 |  | 8/2004 | Rowlands et al. |
| 2004/0221110 | A1 |  | 11/2004 | Rowlands et al. |
| 2006/0085591 | A1 |  | 4/2006 | Kumar et al. |
| 2006/0174067 | A1 |  | 8/2006 | Soules et al. |
| 2007/0079070 | A1 |  | 4/2007 | Piry et al. |
| 2007/0079073 | A1 |  | 4/2007 | Rosenbluth et al. |
| 2007/0266217 | A1 |  | 11/2007 | Moyer et al. |

(Continued)

*Primary Examiner* — Sanjiv Shah
*Assistant Examiner* — Mark Giardino, Jr.
(74) *Attorney, Agent, or Firm* — Trop, Pruner & Hu, P.C.

(57) ABSTRACT

A system, processor and method to monitor specific cache events and behavior based on established principles of quantized architectural vulnerability factor (AVF) through the use of a dynamic cache write policy controller. The output of the controller is then used to set the write back or write through mode policy for any given cache. This method can be used to change cache modes dynamically and does not require the system to be rebooted. The dynamic nature of the controller provides the capability of intelligently switching from reliability to performance mode and back as needed. This method eliminates the residency time of dirty lines in a cache, which increases soft errors (SER) resiliency of protected caches in the system and reduces detectable unrecoverable errors (DUE), while keeping implementation cost of hardware at a minimum.

17 Claims, 6 Drawing Sheets

(56) References Cited

U.S. PATENT DOCUMENTS

| | | |
|---|---|---|
| 2008/0155198 A1 | 6/2008 | Factor et al. |
| 2009/0074002 A1 | 3/2009 | Kam et al. |
| 2009/0172249 A1 | 7/2009 | Matthews |
| 2009/0172304 A1 | 7/2009 | Gueron et al. |
| 2009/0216954 A1 | 8/2009 | Benhase et al. |
| 2009/0217280 A1 | 8/2009 | Miller et al. |
| 2009/0282197 A1 | 11/2009 | Comparan et al. |
| 2009/0327608 A1 | 12/2009 | Eschmann et al. |
| 2010/0042776 A1 | 2/2010 | Seo et al. |
| 2010/0274962 A1 | 10/2010 | Mosek et al. |
| 2011/0047437 A1 | 2/2011 | Flynn |
| 2011/0055837 A1 | 3/2011 | Kumar et al. |
| 2011/0072214 A1 | 3/2011 | Li et al. |
| 2011/0113260 A1 | 5/2011 | Ma et al. |
| 2011/0138106 A1 | 6/2011 | Prabhakaran et al. |
| 2011/0246723 A1 | 10/2011 | Van Der Wolf et al. |
| 2012/0079214 A1 | 3/2012 | Moga et al. |
| 2012/0226871 A1 | 9/2012 | Cantin et al. |
| 2012/0254507 A1 | 10/2012 | Chang et al. |
| 2014/0122809 A1* | 5/2014 | Robertson et al. ............ 711/141 |

\* cited by examiner

DYNAMIC CACHE WRITE POLICY

FIELD

The present disclosure relates to processor architecture, and in particular, a method and apparatus to dynamically control cache write policy for increased reliability.

BACKGROUND

As cache memory sizes increase, cache structures tend to be more vulnerable to soft errors (SER) and detectable unrecoverable errors (DUE), due to the cache retaining modified data for a longer length of time. If a soft error corrupts a modified cache line, the line's data cannot be retrieved or correctly written back. Also, with increasing cache sizes and high-demand workloads, the architectural vulnerability factor (AVF) also increases, resulting in overall reduction of system reliability. What is needed is a cache policy that addresses the susceptibility that occurs when lines remain modified for extended periods of time.

DESCRIPTION

Embodiments of disclosed subject matter pertain to increasing reliability by controlling cache write policy to force write backs of modified lines to system memory or other backing store under prescribed circumstances. At least one embodiment addresses performance penalties that result when conventional periodic flushing and scrubbing are used to decrease vulnerability.

At least one embodiment dynamically controls cache write policy based on observations of the cache vulnerability due to dirty data residencies in order to decrease the rate of soft errors occurring and improve AVF in the system while reducing the amount of performance penalty incurred.

In the following description, details are set forth by way of example to facilitate discussion of the disclosed subject matter. It should be apparent to a person of ordinary skill in the field, however, that the disclosed embodiments are exemplary and not exhaustive of all possible embodiments.

In at least one embodiment, a disclosed method dynamically controls cache write policy in a system for increased SER reliability. In at least one embodiment, a cache controller includes a write policy controller that counts the total number of dirty lines in a cache each clock cycle. In some embodiments, the tracking is accomplished by associating a first counter with a cache line and incrementing a value of the first counter for a write event, i.e., a write to the cache line when the cache line is unmodified, i.e., a write event to an already dirty line should not increment the counter. In some embodiments, the first counter value is decremented or cleared when a write back event occurs. In at least one embodiment, using the tracked number of the dirty lines in the cache in a given cycle, an average number of dirty lines over a plurality of clock cycles is computed. In at least one embodiment, the time interval used to compute the average number of dirty residencies may be a quantum of 1024 or some relevant number of cycles.

In at least one embodiment, the average number of dirty lines is compared with the stored dirty residency threshold, which is based on a percentage of the cache occupied by dirty data. If determination is made that the average dirty residency value is greater than the stored threshold value, the cache policy is switched to a write through mode. If the average dirty residency value is less than the stored threshold value, the write back mode cache policy is selected. Once the cache policy is switched to write through mode, the write policy controller remains in write through mode until the average dirty residency value drops below the stored threshold value, at which point, the cache policy may be switched back to write back mode.

In at least one embodiment, the dynamic control of the cache policy can be accomplished without having to require a system reboot. The system operation may continue while the dirty lines are being flushed. In at least one embodiment, an enhancement to the write policy controller is a configurable memory bandwidth override capability. The memory bandwidth usage is monitored and if a predetermined threshold value is exceeded, the cache policy may be overridden and set back to a cache write back mode. In at least one embodiment, an enhancement to the write policy controller includes a built in hysteresis that requires the stored dirty threshold value to be exceeded for a configurable number of consecutive cycles before the cache policy may switch to a write through mode. Additionally, a hysteresis that requires the stored dirty threshold value to be exceeded for a configurable number of consecutive cycles before the cache policy may be reverted back to a write back mode.

In some embodiments, a disclosed processor includes multiple execution cores and their associated cache memories, a crossbar, a last level cache, a cache controller and a dynamic cache write controller. At least one embodiment includes an execution core to execute instructions and a last level cache (LLC) to provide fast access to near memory data needed by the processor cores. In some embodiments, a cache controller controls communication between the crossbar with the LLC.

In at least one embodiment, the cache controller includes a write policy controller to modify cache write policy dynamically based on observation of the cache vulnerability due to dirty data. The write policy controller tracks the number of dirty lines in a cache in a given cycle. In some embodiments, the tracking is accomplished by associating a counter with a cache line when unmodified and incrementing the counter's value for a write event to the cache line and clearing or decrementing the counter's value for a write back event. In at least one embodiment, using the tracked number of the dirty lines in the cache in a given cycle, an average number of dirty lines over a plurality of clock cycles is computed. In at least one embodiment, the average number of dirty lines is compared with a stored dirty residency threshold, which is based on a percentage of the cache occupied by dirty data. If determination is made that the average number of dirty lines value is greater than the stored threshold value, a write through mode policy is selected. If the average number of dirty lines value is less than the stored threshold value, the write back mode policy is selected. Once the cache policy is switched to write through mode, the write policy controller remains in write through mode until the average dirty residency value drops below the stored threshold value, at which point, the cache policy is switched back to write back mode.

In some embodiments, a disclosed multiprocessor system includes a processor and storage accessible to the processor. The system includes first storage to store an operating system and dirty cache line information.

In at least one embodiment, the processor in the disclosed multiprocessor system includes multiple execution cores and their associated cache memories, a crossbar, a last level cache, a cache controller and a dynamic cache write controller. In at least one embodiment, the processor's uncore region includes a write policy controller to modify cache write policy dynamically based on observation of the cache vulnerability due to dirty data. The write policy controller keeps track of the number of dirty lines in a cache in a given cycle. The tracking is accomplished by incrementing a first value for a write event to a clean or unmodified line and decrementing the said first value for a write back event when a write renders a line dirty. In at least one embodiment, using the tracked number of the dirty lines in the cache, the average number of dirty lines over a plurality of clock cycles is computed. In at least one embodiment, the average number of dirty lines is compared with a stored dirty residency threshold, which is based on a percentage of the cache occupied by dirty data. If determination is made that the average number of dirty lines value is greater than the stored threshold value, a write through mode cache policy is selected. If the average number of dirty lines value is less than the stored threshold value, the cache policy remains in the write back mode. Once the cache policy is switched to write through mode, the write policy controller may remain in write through mode until the average dirty residency value drops below the stored threshold value, at which point, the cache policy may be switched back to write back mode.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
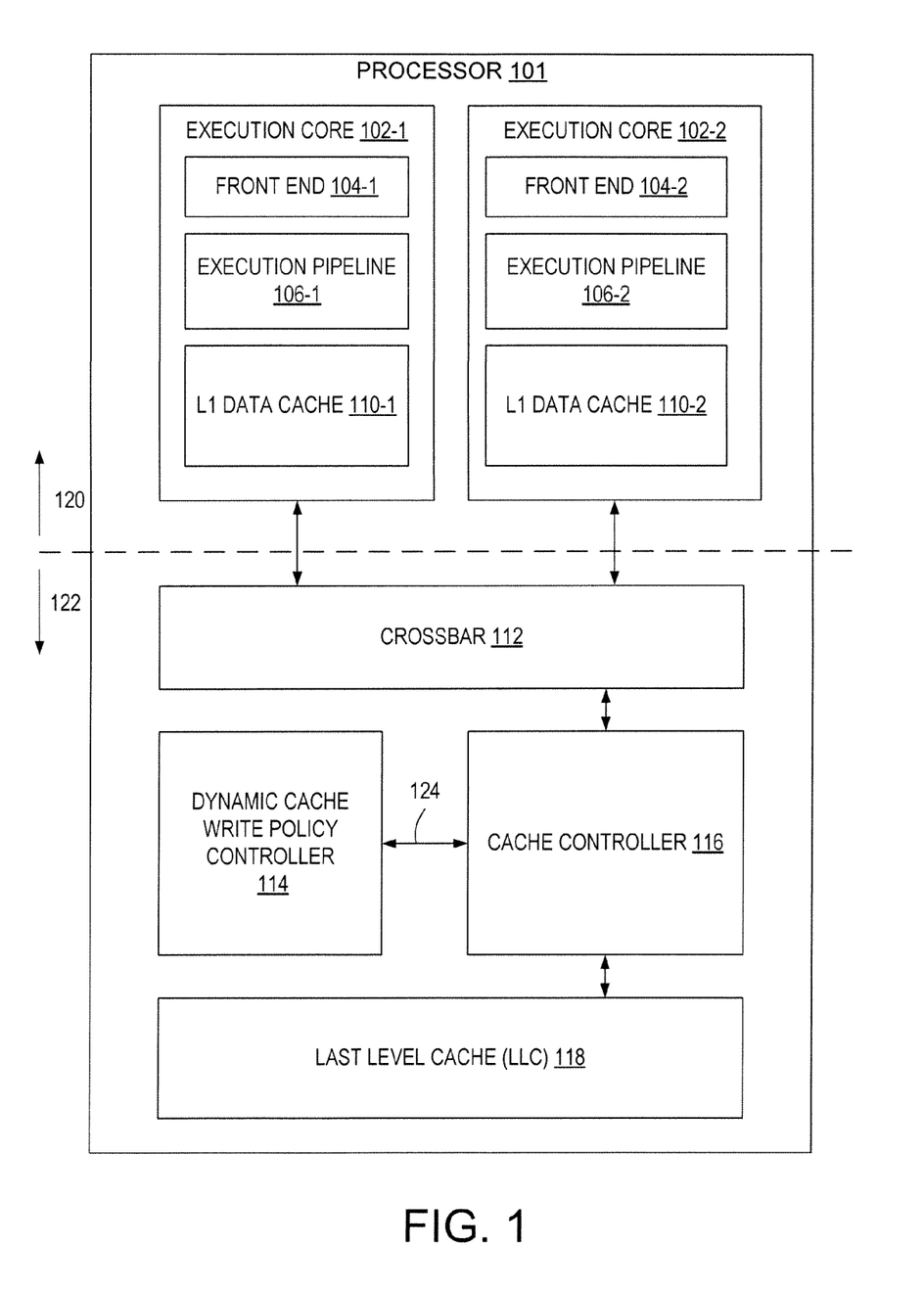
FIG. 1 illustrates a multi-core processor used in conjunction with at least one embodiment.

Referring now to FIG. 1, a block diagram of selected elements of processor 101 is shown. While processor 101 may be a multi-core processor including a plurality of processor cores, the disclosed method is applicable for a single core processor as well. In FIG. 1, the embodiment of processor 101 is shown with a core region 120 including first execution core 102-1 and second execution core 102-2. It is noted that other elements of processor 100 besides execution cores 102 may be referred to as an uncore region 122. Although two cores are depicted in the example embodiment in FIG. 1 for descriptive clarity, in various embodiments, a different number of cores may be employed using elements of the depicted architecture. Execution cores 102 may comprise a number of sub-elements, also referred to as clusters, that provide different aspects of overall functionality. For example, execution cores 102 may each include front-end 104, execution pipeline 106 and a first level (L1) data cache 110.

In FIG. 1, front-end 104 may be responsible for fetching instruction bytes and decoding those instruction bytes into micro-operations that execution pipeline 106 may consume. Thus, front-end 104 may be responsible for ensuring that a steady stream of micro-operations is fed to execution pipeline 106. Execution pipeline 106 may be responsible for scheduling and executing micro-operations and may include buffers for reordering micro-operations and a number of execution ports (not shown in FIG. 1).

During operation, memory requests from execution pipeline 106 may first access L1 data cache 110 before looking up any other caches within a system. In the embodiment shown in FIG. 1, L1 data cache 110 may be a final lookup point for each execution core 102 before a request is issued to the LLC 118, which is a shared cache among execution cores 102.

As shown in FIG. 1, processor 101 includes last LLC 118, which may be a higher-level cache that operates in conjunction with L1 data cache 110. Thus, L1 data cache 110 and LLC 118 may represent a cache hierarchy. In particular embodiments, first execution core 102-1 and second execution core 102-1 within processor 101 are not equipped with direct means of communicating with each other, but rather, communicate via crossbar 112, which may include intelligent functionality such as cache control, data queuing, P-P protocols, and multi-core interfacing. Crossbar 112 may thus represent an intelligent uncore controller that interconnects execution cores 102 with LLC 118.

As shown in FIG. 1, uncore region 122 may include a cache controller 116 to control communication between crossbar 112 with LLC 118. Dynamic cache write policy controller 114 may use communication line 124 to communicate with cache controller 116. Write policy controller 114 may monitor specific cache events and behavior in LLC 118 and based on the output of the controller, may set the write back or write through mode policy. While in this embodiment, write policy controller 114 is depicted monitoring and controlling LLC 118, the disclosed dynamic cache write policy controller may be utilized to monitor and set the write back or write through policy for any given cache in a processor system in order to improve the AVF and reduce the number of soft errors. Although embodiments illustrated in the drawings and described herein may refer to controlling the write policy of a shared or last level cache, the write policy of any cache memory, including caches that are private with respect to a specific processor core, may be controlled in the same manner.

Figure 2:
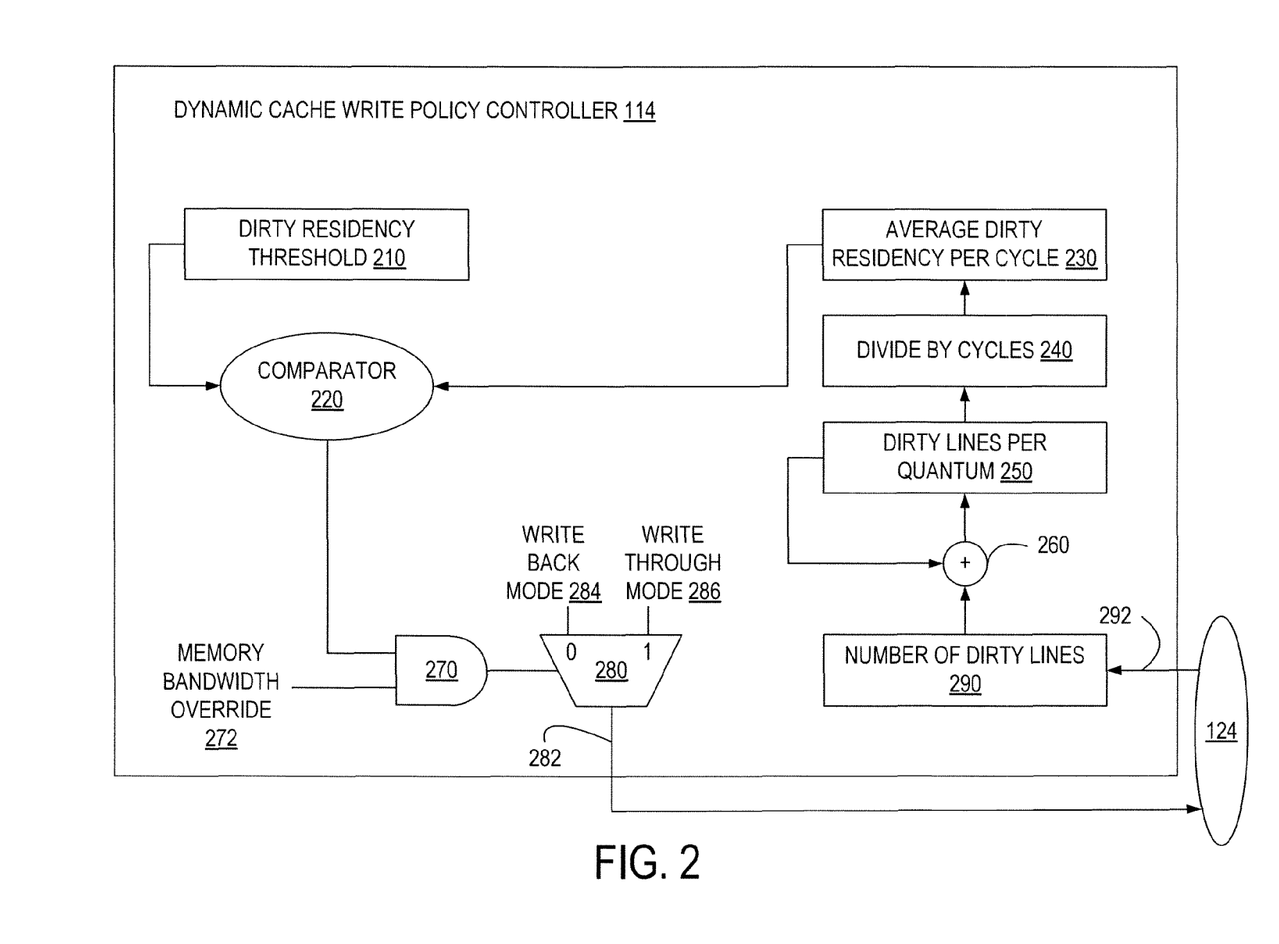
FIG. 2 illustrates a dynamic cache write policy controller used in conjunction with at least one embodiment.

Referring now to FIG. 2, a block diagram of elements of a dynamic cache write policy controller. A controller to provide dynamic intelligence to set the write back or write through mode, in order to increase SER tolerance for any given cache in a processor system. Write policy controller 114 communicates bi-directionally with the cache controller through communication line 124. The cache controller communicates through communication line 124 to provide write policy controller 114 the number of dirty lines in the cache through 292 to block 290. Write policy controller 114 then computes the average number of dirty residency per cycle, known as a quantum, for reducing SER.

The number of dirty lines 290 is tracked in a given cycle by incrementing on each write event and decrementing on each write back event 260 when a write renders a line dirty. A write event to an already dirty line should not increment the counter. Dirty lines per quantum 250, read out data and reset to zero every 1024 cycles, is modified by dividing by number of cycles 240 to compute the average residency per cycle 230.

The average dirty residency per cycle 230 is then compared to the stored dirty residency threshold value 210. In some embodiments, dirty residence threshold value 210 is a programmable value the may be changed under program control to provide dynamic, configurable control over the cache write policy and associated reliability concerns. The dirty residency threshold value is based on the percentage of cache occupied by dirty data and may be configurable. If during comparison 220, the average dirty residency per cycle 230 is found to be higher than the stored dirty residency threshold value 210, multiplexor 280 would set write through mode 286 and communicate the setting 282 to 124. The cache would be set to write through mode 286 until the average dirty residency per cycle 230 drops below the dirty residency threshold value 210, at which point it would switch back to write back mode 284.

In FIG. 2, an additional enhancement to write policy controller 114 addresses the issue of performance degradation due to conversion to write through mode 286, as write through caches provide inferior system performance in comparison to write back caches. Write policy controller 114 may be enhanced to monitor the memory bandwidth usage. If write policy controller 114 determines that memory bandwidth usage, due to reasons not related to the write through mode, is increasing and that the write through mode 286 may hamper performance beyond some acceptable threshold, write policy controller 114 may override 272 the cache policy and keep the cache in write back mode 284. The result of 220 and memory bandwidth usage override 272 are necessary, with the use of AND gate 270, in order to override the cache policy. This memory bandwidth override threshold 272 is configurable and has the added feature of the ability to be enabled or disabled.

Figure 3:
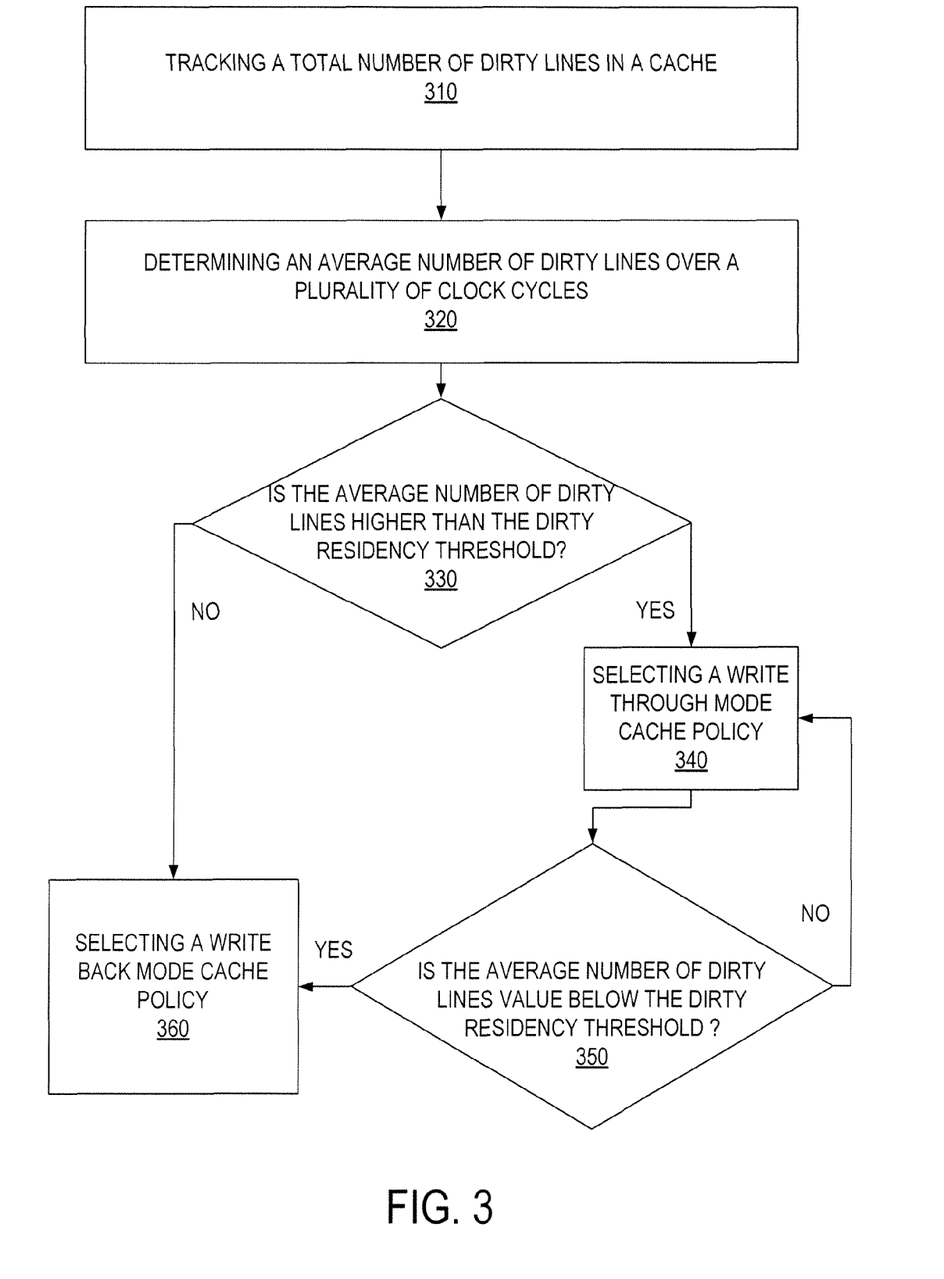
FIG. 3 illustrates one embodiment of a method for increasing reliability by controlling cache write policies.

Referring now to FIG. 3, a flow diagram of a method to dynamically control cache write policy for increased reliability. In process block 310, the write policy controller tracks the total number of dirty lines in the cache as communicated by the cache controller. Write policy controller then computes the average number of dirty residencies in process block 320. In decision block 330, the average number of dirty residencies is compared to the stored dirty residency threshold value. If determination is made that the average number of dirty residencies value is higher than the stored dirty residency threshold, the cache policy is set to write through mode 330. If the average number of dirty residencies is not higher than the threshold value, the write back mode cache policy is selected 360. In decision block 350, the write policy controller determines if the average number of dirty lines value drops below the stored dirty residency threshold value. If determination is made that the value drops below the stored dirty residency threshold value, the write back mode cache policy is selected 360. Otherwise, the write through mode cache policy is selected 340.

Figure 4:
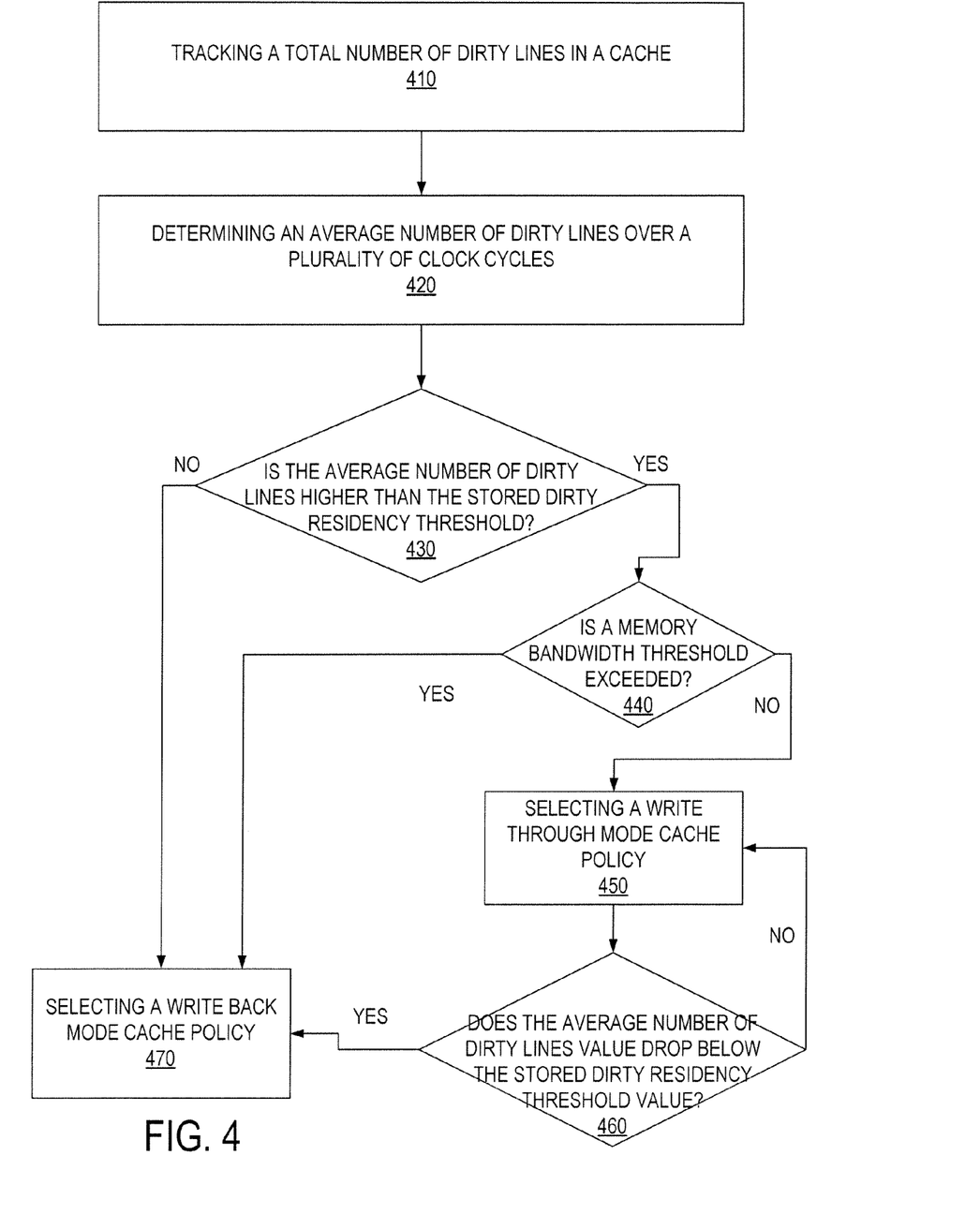
FIG. 4 illustrates one embodiment of a method for increasing reliability by controlling cache write policy with a memory bandwidth override control option.

Referring now to FIG. 4, a flow diagram of a method to dynamically control cache write policy with a memory bandwidth override control option. In process block 410, the write policy controller tracks the total number of dirty lines in the cache as communicated by the cache controller. Write policy controller then computes the average number of dirty residencies in process block 420. In decision block 430, the average number of dirty residencies is compared to the stored dirty residency threshold value. If the average number of dirty residencies is not higher than the stored dirty residency threshold value, the cache policy selects the write back mode as the cache policy 470.

If determination is made that the average number of dirty residencies value is higher than the stored dirty residency threshold, decision block 440 then determines if the memory bandwidth threshold is exceeded. If the memory bandwidth usage threshold is exceeded, write policy controller may override the cache policy and keep the cache in write back mode 470. If determination is made that memory bandwidth usage threshold is not exceeded, a write through mode cache policy is selected 450. In decision block 460, the write policy controller determines if the average number of dirty lines value drops below the stored dirty residency threshold value. If determination is made that the value drops below the stored dirty residency threshold value, the cache policy is switched back to the write back mode 470. Otherwise, the write through mode cache policy is selected 450.

Figure 5:
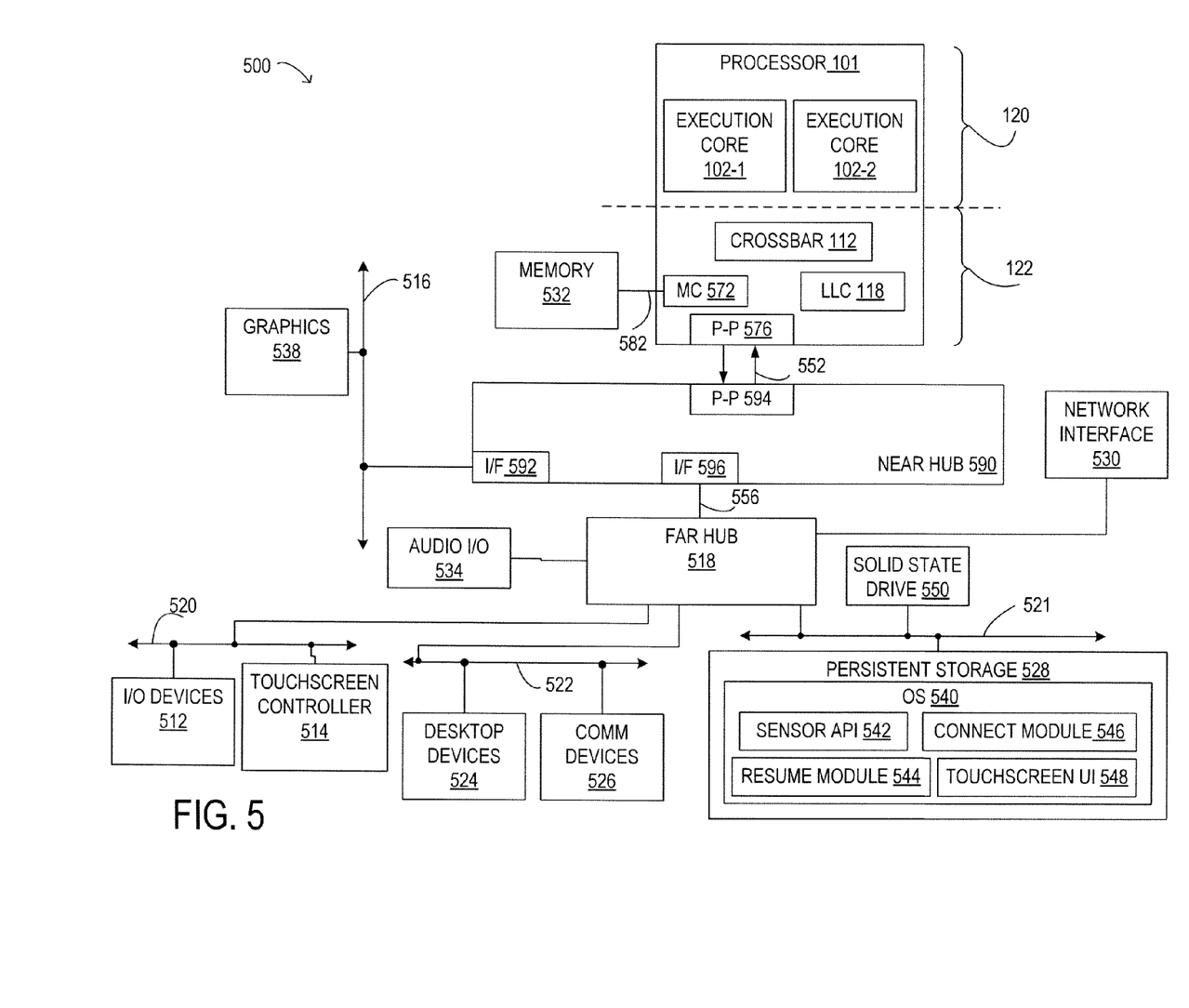
FIG. 5 illustrates a computing system used in conjunction with at least one embodiment.

Embodiments may be implemented in many different system types. Referring now to FIG. 5, a block diagram of selected elements of a processor system in accordance with an embodiment of the present disclosure. FIG. 5 shows a system in which a processor, memory, and input/output devices are interconnected by a number of point-to-point (P-P) interfaces, as will be described in further detail. However, in other embodiments (not shown in FIG. 5) the processor system may employ different bus architectures, such as a front side bus, a multi-drop bus, and/or another implementation. Although a processor is depicted in the example embodiment of FIG. 5 for descriptive clarity, in various embodiments, a different number of processors may be employed using elements of the depicted architecture.

In FIG. 5, processor platform 500 is a point-to-point interconnect system, and includes processor 101. While only a single processor is depicted in processor platform 500, the platform may support multiple processors. As shown in FIG. 5, processor 101 is a multi-core processor including first execution core 102-1 and second execution core 102-2. It is noted that other elements of processor 101 besides execution cores 102 may be referred to as an uncore region 122, while execution cores 102 may also be referred to as core region 120. In different embodiments (not shown in FIG. 5), a varying number of cores may be present in a particular processor. Execution cores 102 may comprise a number of sub-elements (not shown in FIG. 5), also referred to as clusters, that provide different aspects of overall functionality. For example, execution cores 102 may each include a memory cluster (not shown in FIG. 5) that may comprise one or more levels of cache memory. Other clusters (not shown in FIG. 5) in execution cores 102 may include a front-end cluster and an execution pipeline cluster. Execution cores 102 may include a L1 data cache.

In particular embodiments, execution cores 102 within processor 101 are not equipped with direct means of communicating with each other, but rather, communicate via crossbar 112, which may include intelligent functionality such as cache control, data queuing, P-P protocols, and multi-core interfacing. Crossbar 112 may thus represent an intelligent uncore controller that interconnects execution cores 102 with memory controller (MC) 572, last-level cache memory (LLC) 118, and P-P interface 576, among other elements. In particular, to improve performance in such an architecture, cache controller functionality within crossbar 112 may enable selective caching of data within a cache hierarchy including LLC 118 and one or more caches present in execution cores 102. In certain implementations of processor system 500, crossbar 112 is referred to as a global queue.

In FIG. 5, LLC 118 may be coupled to a pair of processor execution cores 102, respectively. For example, LLC 118 may be shared by execution core 102-1 and execution core 102-2. LLC 118 may be fully shared such that any single one of execution cores 102 may fill or access the full storage capacity of LLC 118. Additionally, MC 572 may provide for direct access by processor 101 to memory 532 via memory interface 582. For example, memory 532 may be a double-data rate (DDR) type dynamic random-access memory (DRAM) while memory interface 582 and MC 572 comply with a DDR interface specification. Memory 532 may represent a bank of memory interfaces (or slots) that may be populated with corresponding memory circuits for a desired DRAM capacity.

Processor 101 may also communicate with other elements of processor system 500, such as near hub 590 and far hub 518, which are also collectively referred to as a chipset that supports processor 101. P-P interface 576 may be used by processor 101 to communicate with near hub 590 via interconnect link 552. In certain embodiments, P-P interfaces 576, 594 and interconnect link 552 are implemented using Intel QuickPath Interconnect architecture.

As shown in FIG. 5, near hub 590 includes interface 592 to couple near hub 590 with first bus 516, which may support high-performance I/O with corresponding bus devices, such as graphics 538 and/or other bus devices. Graphics 538 may represent a high-performance graphics engine that outputs to a display device (not shown in FIG. 5). In one embodiment, first bus 516 is a Peripheral Component Interconnect (PCI) bus, such as a PCI Express (PCIe) bus and/or another computer expansion bus. Near hub 590 may also be coupled to far hub 518 at interface 596 via interconnect link 556. In certain embodiments, interface 596 is referred to as a south bridge. Far hub 518 may provide I/O interconnections for various computer system peripheral devices and interfaces and may provide backward compatibility with legacy computer system peripheral devices and interfaces. Thus, far hub 518 is shown providing network interface 530 and audio I/O 534, as well as, providing interfaces to second bus 520, third bus 522, and fourth bus 521, as will be described in further detail.

Second bus 520 may support expanded functionality for microprocessor system 500 with I/O devices 512 and touchscreen controller 514, and may be a PCI-type computer bus. Third bus 522 may be a peripheral bus for end-user consumer devices, represented by desktop devices 524 and communication devices 526, which may include various types of keyboards, computer mice, communication devices, data storage devices, bus expansion devices, etc. In certain embodiments, third bus 522 represents a Universal Serial Bus (USB) or similar peripheral interconnect bus. Fourth bus 521 may represent a computer interface bus for connecting mass storage devices, such as hard disk drives, optical drives, disk arrays, which are generically represented by persistent storage 528 that may be executable by processor 101.

The FIG. 5 embodiment of system 500 emphasizes a computer system that incorporates various features that facilitate handheld or tablet type of operation and other features that facilitate laptop or desktop operation. In addition, the FIG. 5 embodiment of system 500 includes features that cooperate to aggressively conserve power while simultaneously reducing latency associated with traditional power conservation states.

The FIG. 5 embodiment of system 500 includes an operating system 540 that may be entirely or partially stored in a persistent storage 528. Operating system 540 may include various modules, application programming interfaces, and the like that expose to varying degrees various hardware and software features of system 500. The FIG. 5 embodiment of system 500 includes, for example, a sensor application programming interface (API) 542, a resume module 544, a connect module 546, and a touchscreen user interface 548. System 500 as depicted in FIG. 5 may further include various hardware/firm features include a capacitive or resistive touch screen controller 514 and a second source of persistent storage such as a solid state drive 550.

Sensor API 542 provides application program access to one or more sensors (not depicted) that may be included in system 500. Examples of sensors that system 500 might have include, as examples, an accelerometer, a global positioning system (GPS) device, a gyro meter, an inclinometer, and a light sensor. The resume module 544 may be implemented as software that, when executed, performs operations for reducing latency when transition system 500 from a power conservation state to an operating state. Resume module 544 may work in conjunction with the solid state drive (SSD) 550 to reduce the amount of SSD storage required when system 500 enters a power conservation mode. Resume module 544 may, for example, flush standby and temporary memory pages before transitioning to a sleep mode. By reducing the amount of system memory space that system 500 is required to preserve upon entering a low power state, resume module 544 beneficially reduces the amount of time required to perform the transition from the low power state to an operating state. The connect module 546 may include software instructions that, when executed, perform complementary functions for conserving power while reducing the amount of latency or delay associated with traditional "wake up" sequences. For example, connect module 546 may periodically update certain "dynamic" applications including, as examples, email and social network applications, so that, when system 500 wakes from a low power mode, the applications that are often most likely to require refreshing are up to date. The touchscreen user interface 548 supports a touchscreen controller 514 that enables user input via touchscreens traditionally reserved for handheld applications. In the FIG. 5 embodiment, the inclusion of touchscreen support in conjunction with support for communication devices 526 and the enable system 500 to provide features traditionally found in dedicated tablet devices as well as features found in dedicated laptop and desktop type systems.

Figure 6:
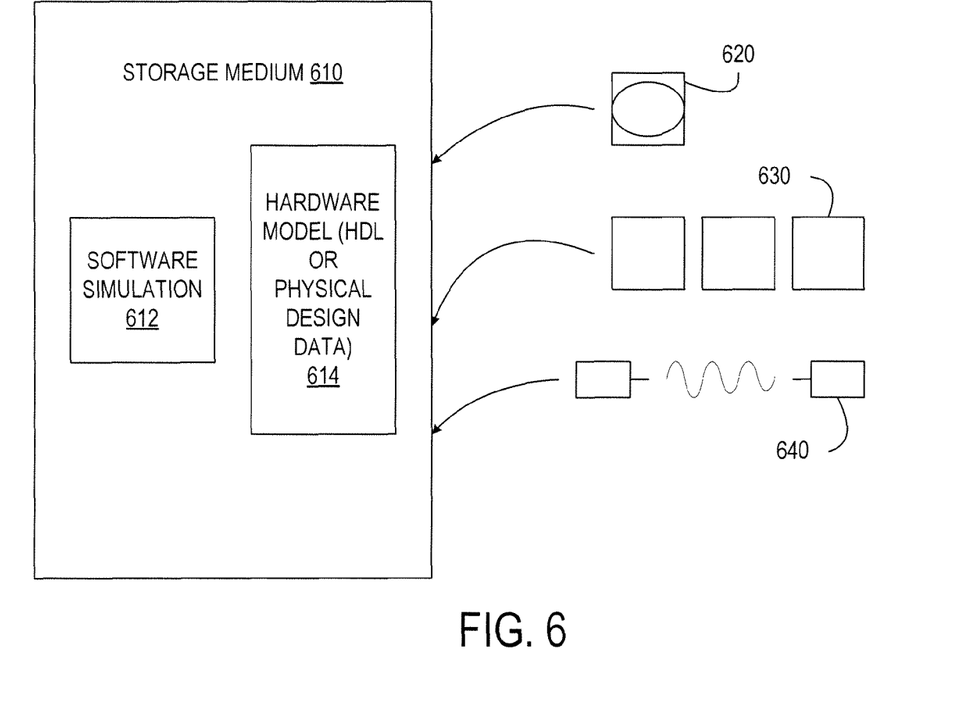
FIG. 6 illustrates one embodiment of a representation for simulation, emulation and fabrication of a design implementing disclosed techniques.

Referring now to FIG. 6, a representation for simulation, emulation and fabrication of a design implementing the disclosed techniques. Data representing a design may represent the design in a number of manners. First, as is useful in simulations, the hardware may be represented using a hardware description language or another functional description language which essentially provides a computerized model of how the designed hardware is expected to perform. The hardware model 614 may be stored in a storage medium 610 such as a computer memory so that the model may be simulated using simulation software 612 that applies a particular test suite to the hardware model 614 to determine if it indeed functions as intended. In some embodiments, the simulation software 612 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. An optical or electrical wave 640 modulated or otherwise generated to transmit such information, a memory 630, or a magnetic or optical storage 620 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method, comprising:
    tracking a total number of dirty lines in a cache, wherein tracking includes:
        updating a first value in a first direction for a write event; and
        updating the first value in a second direction for a write back event;
    determining an average number of dirty lines over an interval of time corresponding to a plurality of clock cycles based on the first value and the plurality of clock cycles;
    comparing the average number of dirty lines to a dirty residency threshold and selecting one of a write through mode and a write back mode as a cache policy of the cache responsive to the comparing; and
    responsive to detecting memory bandwidth usage exceeding a threshold value, selecting the write back mode as the cache policy regardless of the average number of dirty lines, wherein the memory bandwidth usage is monitored for compliance to the threshold value.

2. The method of claim 1, wherein the dirty residency threshold indicates a threshold for a percentage of the cache occupied by dirty data.

3. The method of claim 1, wherein the selecting of the write through mode or the selection of the write back mode occurs without a system reboot.

4. The method of claim 1, wherein the selecting of the write through mode occurs in response to the dirty residency threshold being exceeded by the average number of dirty lines for a number of consecutive cycles before the cache policy would switch to the write through mode.

5. The method of claim 4, wherein the selecting of the write back mode occurs in response to the average number of dirty lines not being higher that the dirty residency threshold for the number of consecutive cycles.

6. A processor, comprising:
    an execution core;
    a cache memory coupled to the execution core; and
    a cache controller to:
        track a total number of dirty lines in the cache memory; and
        select between a write through cache policy and a write back cache policy based on an average number of dirty lines over an interval, wherein the cache controller is to:
            select the write through cache policy when the average number of dirty lines exceeds a dirty residency threshold for a first number of clock cycles; and
            select the write back cache policy when the average number of dirty lines does not exceed the dirty residency threshold for a second number of clock cycles.

7. The processor of claim 6, wherein the cache controller is to override a cache policy indicated based on the average number of dirty lines when memory bandwidth usage exceeds a threshold value.

8. The processor of claim 7, wherein the processor is to monitor the memory bandwidth usage.

9. The processor of claim 6, wherein the cache controller is to select between the write through cache policy and the write back cache policy based on whether the average number of dirty lines exceeds a threshold portion of the cache memory.

10. The processor of claim 6, wherein the cache controller is to select between the write through cache policy and the write back cache policy without a system reboot.

11. A system, comprising:
    first storage to store an operating system; and
    a processor, comprising:
        an execution core;
        a cache memory coupled to the execution core; and
        a cache controller to:
            monitor a total number of dirty lines in the cache memory; and
            select between a write through cache policy and a write back cache policy for the cache memory based on an average number of dirty lines over an interval, wherein the cache controller is to:
                select the write through cache policy when the average number of dirty lines exceeds a dirty residency threshold for a first number of clock cycles; and
                select the write back cache policy when the average number of dirty lines does not exceed the dirty residency threshold for a second number of clock cycles.

12. The system of claim 11, wherein the cache controller is to:
    monitor a memory bandwidth usage; and
    override a cache policy indicated based on the average number of dirty lines when memory bandwidth usage exceeds a threshold value.

13. The system of claim 12, wherein the threshold value is programmable and wherein the first storage is to store the programmable threshold value.

14. The system of claim 11, wherein the cache controller is to:
    associate a first counter with a cache line;
    increment the first counter for a write event to the cache line when the cache line is unmodified;
    clear the first counter in response to a write back of the cache line; and
    add a value of the first counter to a cumulative counter each clock cycle.

15. The system of claim 14, wherein the cache controller is to:
    associate a plurality of counters one to each of a plurality of cache lines, wherein the plurality of cache lines is a subset of all cache lines in the cache memory;
    monitor a number of dirty lines in the plurality of cache lines with the plurality of counters; and
    add a value of each of the plurality of counters to the cumulative counter each clock cycle.

16. The system of claim 15, wherein the cache controller is to estimate the total number of dirty lines based on the plurality of cache lines in the subset.

17. The system of claim 11, wherein the processor is to change between the write through cache policy and the write back cache policy without reboot of the system.

* * * * *